June 11, 1946.  L. G. SIMJIAN  2,401,975
TRAINING APPARATUS
Filed Nov. 2, 1943  4 Sheets-Sheet 1
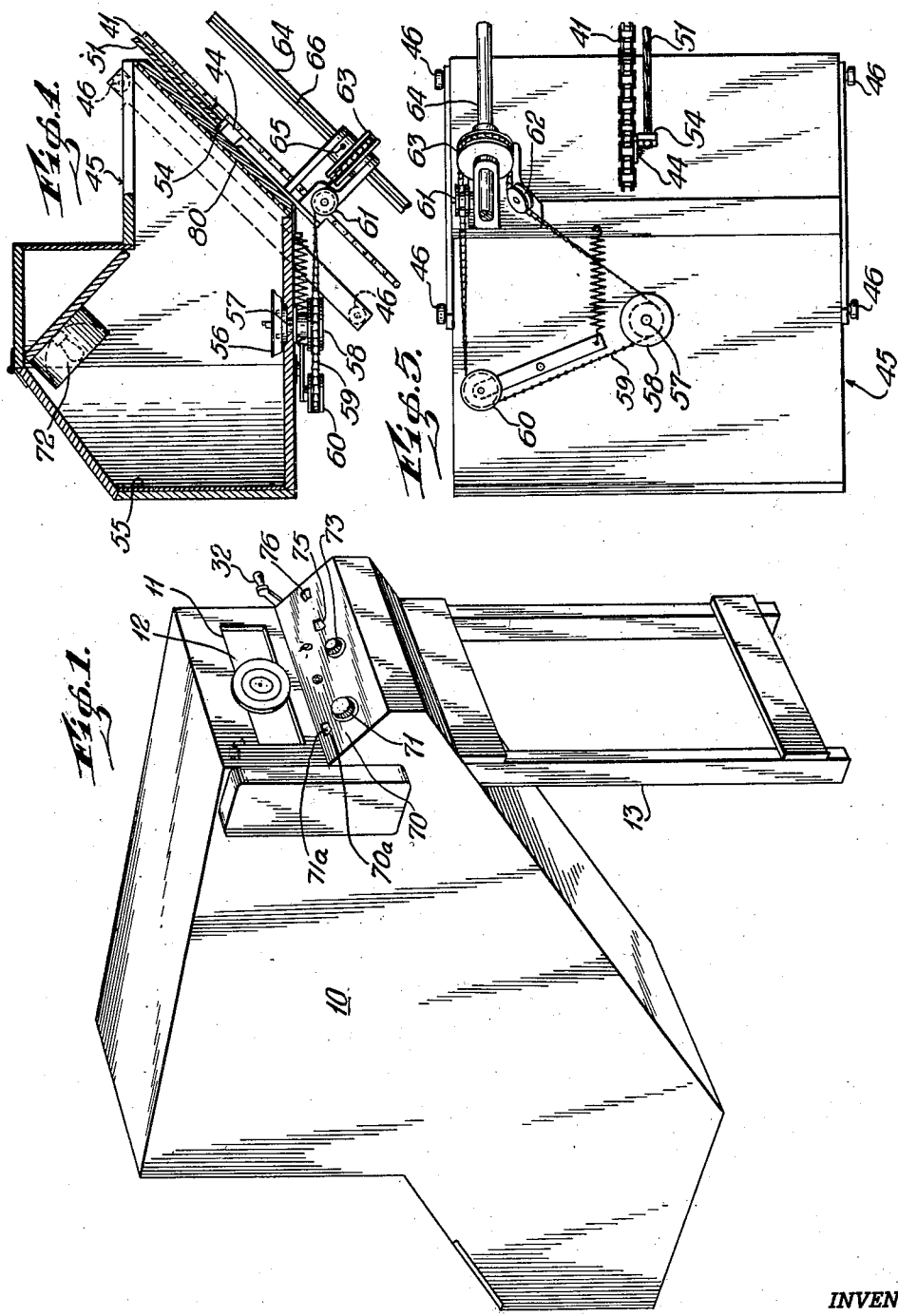
INVENTOR
Luther G. Simjian
BY A. H. Golden
ATTORNEY

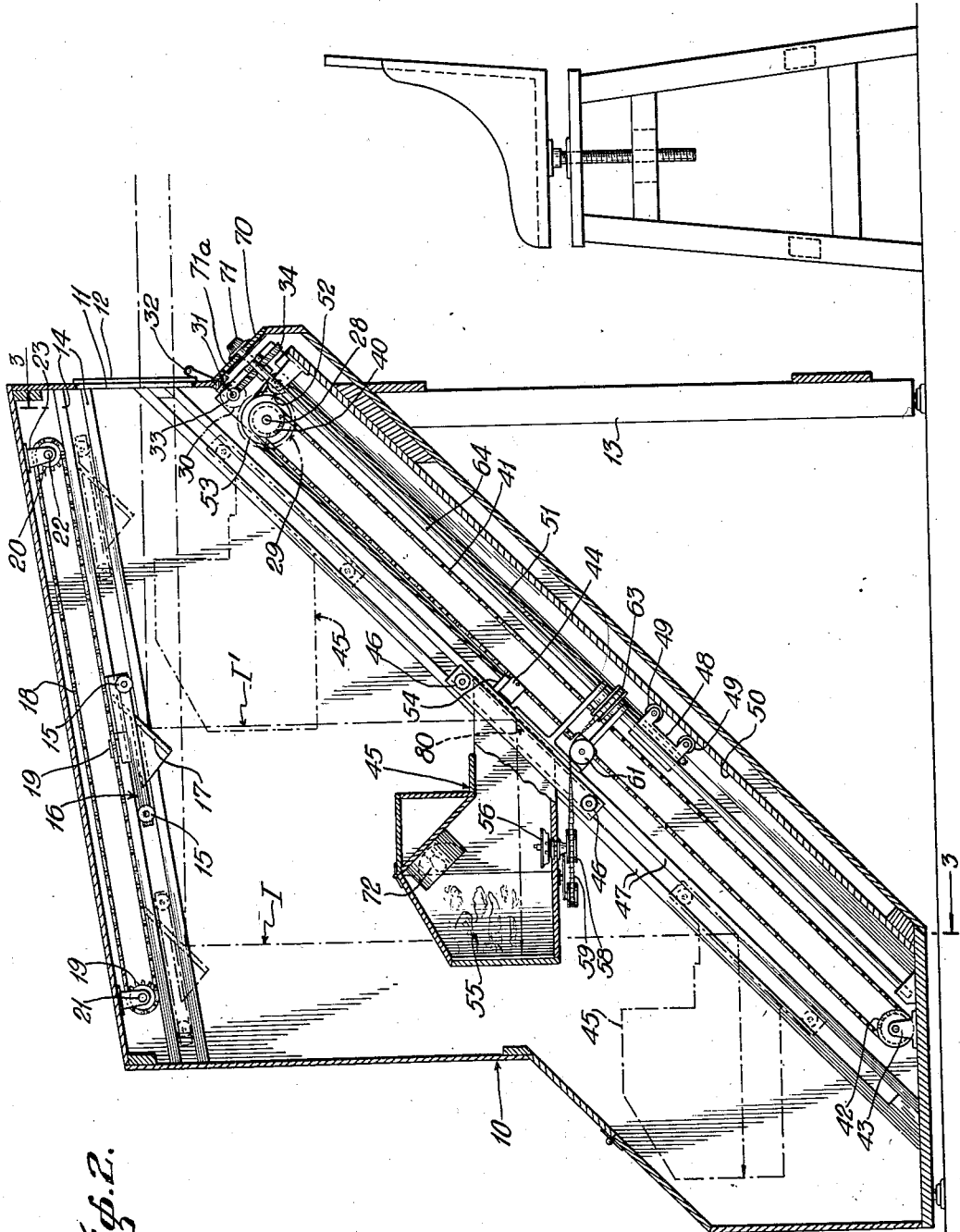

June 11, 1946. L. G. SIMJIAN 2,401,975
TRAINING APPARATUS
Filed Nov. 2, 1943 4 Sheets-Sheet 3
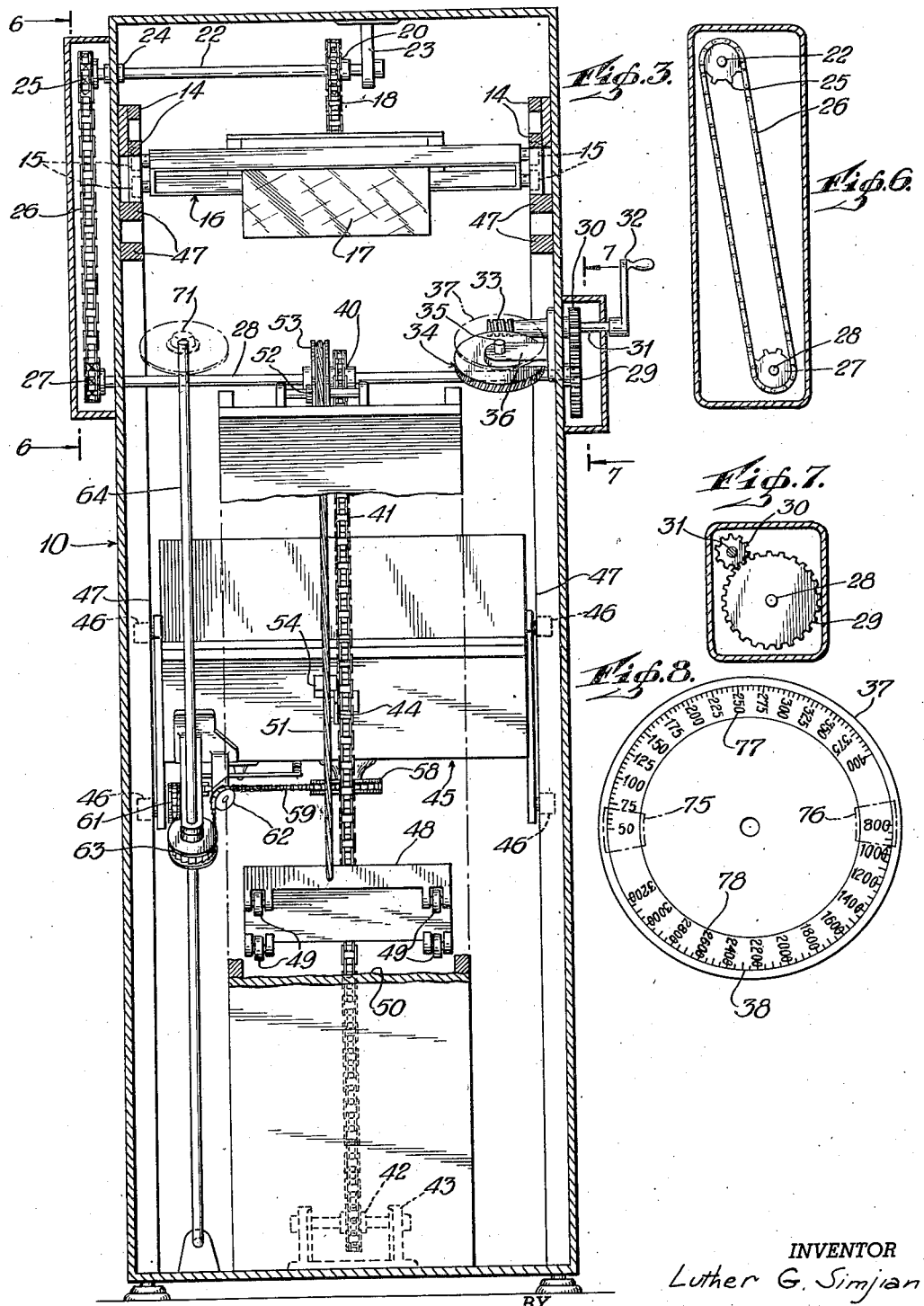
INVENTOR
Luther G. Simjian
BY H. Golden
ATTORNEY

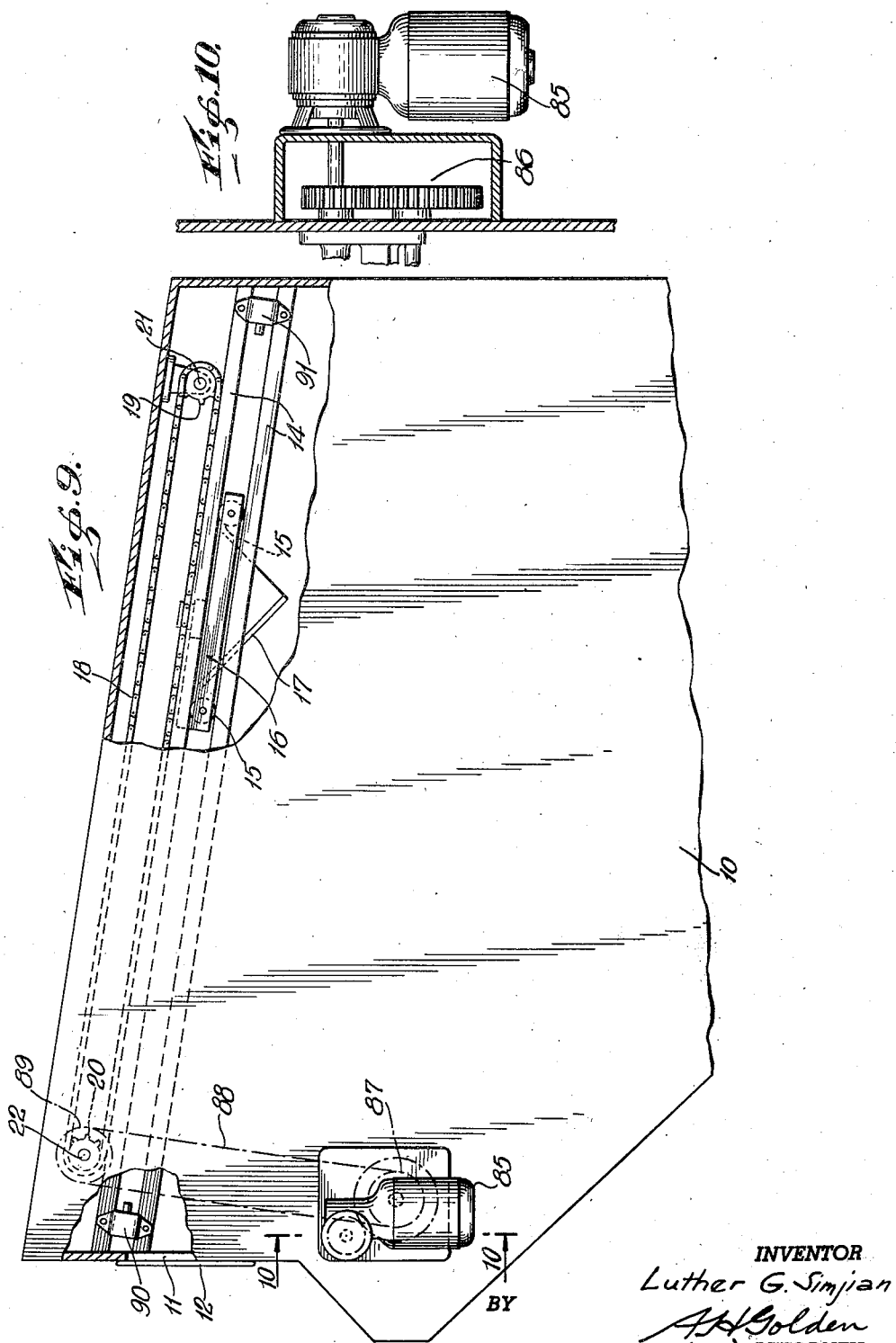

Patented June 11, 1946

2,401,975

UNITED STATES PATENT OFFICE 2,401,975

TRAINING APPARATUS

Luther G. Simjian, Riverside, Conn.

Application November 2, 1943, Serial No. 508,667

27 Claims. (Cl. 35—25)

This invention relates to a training apparatus useful in the training of aviators. More particularly, the invention is useful in the training of pilots of torpedo bombers. Those skilled in the art will fully appreciate, after a reading of the specification of this application, that my invention may readily be adapted for the training of pilots of other types of planes, as for example, dive bombers and that therefore the specific form of my invention should not be considered as limiting the scope thereof.

As a feature of my invention, a pilot may be taught the preferred relation of his plane relatively to a ship that he is attacking with a torpedo bomber. It is a feature of my invention that the pilot may view from a sighting point a ship that will appear to him in exactly the same relationship as though he were in a torpedo bomber approaching the ship. The term sighting point is used to designate that structural portion of the apparatus of my invention where the eyes of the student pilot are to be positioned in the use of the apparatus. Because the apparatus of my invention will demonstrate the best type of bombing run, the pilot will naturally learn the preferred manner in which to make a bombing run with a torpedo bomber.

For a description of my invention I shall refer to the drawings wherein

Fig. 1 is a general perspective view of the outside of a casing into which my apparatus is incorporated.

Fig. 2 is a vertical section through the casing of Fig. 1.

Fig. 3 is a section taken along lines 3—3 of Fig. 2.

Fig. 4 is an enlarged view of certain of the parts of Fig. 2.

Fig. 5 is a view looking upwardly toward the bottom of Fig. 4.

Fig. 6 is a section taken along lines 6—6 of Fig. 3 while

Fig. 7 is a section taken along lines 7—7 of Fig. 3.

Fig. 8 is a plan view of the indicator dial used for indicating the distance and altitude of the plane relatively to the ship being attacked.

Fig. 9 is a partial section through a modified form of the invention in which the mirror carriage is power driven.

Fig. 10 is a section taken along lines 10—10 of Fig. 9.

Referring now more particularly to the drawings, the casing in which my invention is housed is designated by reference numeral 10, and is fabricated from plywood or wood frame members covered with cloth or other material. The manner in which the casing and the other parts of my invention are fabricated is not of real importance. Thus, in the construction I shall herein describe, I have used non-critical materials in order to cooperate with the war effort, but naturally other materials and fabricating methods may be used.

The front of the casing 10 is formed with an opening 11 at which is secured a sighting device 12 such as would be employed on a plane of the type for which the pilot is being trained. Wooden legs 13 support the casing 10 at its forward end, the rear of the casing resting with its bottom portion on the floor.

As best shown in Fig. 2, the upper end of the casing 10 has secured at each side thereof rails 14 cooperating with rollers 15 mounted on what I term a mirror carriage 16. As shown, the rails 14 are inclined upwardly to form an inclined path for the mirror carriage 16. Secured on the mirror carriage 16 is a mirror 17, it being the function of the mirror 17 to reflect an image towards the sight 12. Incidentally, it may be well to indicate that the sight 12 is preferably mounted for pivotal adjustment in order that it may be secured in a preferred sighting position.

A suitable sprocket chain 18 is fixed at 19 to the mirror carriage 16 and is in driven relation to sprockets 19 and 20 mounted respectively on shafts 21 and 22. The shaft 22 is supported at one end on a bracket 23 depending from the casing 10 as best shown in Fig. 2. The other end of the shaft 22 is supported in a bearing 24 in the casing and carries a sprocket 25 driven by a roller chain 26 that is in driven relation to a further sprocket 27. The sprocket 27 is secured to the end of a shaft 28 that is supported in the casing and is rotated by a gear 29 in engagement with a pinion 30. This pinion 30 is secured on a shaft 31 suitably supported in the casing and rotated by a handle 32. It is now quite readily seen that as the handle 32 rotates, it may move through the intermediary of the several sprockets and roller chains, the mirror carriage 16 in the inclined path determined by the rails 14.

The inner end of the shaft 31 carries a worm 33 that is in driving relation to a worm gear 34 carried on a shaft 35 supported in the bracket 36. Secured to the shaft 35 is an indicator disc 37 on which is mounted the indicator dial 38 best illustrated in Fig. 8. I shall later describe in detail the particular significance of the indicator 38.

The shaft 28, as best illustrated in Fig. 2, carries a sprocket 40 that is in driving engagement with a sprocket chain 41 that passes over an idler sprocket 42 mounted for rotation relatively to the bracket 43 secured to the bottom of the casing 10. This sprocket chain 41 is secured at 44 to what I term an object carriage 45. The object carriage 45 carries rollers 46 at each side thereof, the said rollers 46 riding between rails 47 secured to each side of the casing 10, in the same manner as are secured the rails 14. It is of course now obvious that the object carriage 45 moves in the inclined path determined by the rails 47, and is moved in that path through the intermediary of the sprocket chain 41 and the same shaft 28 that drives the mirror carriage 16 earlier described.

For counterbalancing the object carriage 45 I utilize a weight 48 equipped with rollers 49 whereby the said weight may ride freely on the surface 50 of the casing 10. The counterweight 48 is secured to a cable 51 that passes over a pulley 52 and a further pulley 53 to be secured at 54 to the object carriage 45. The operation and function of the counterweight will of course now be quite apparent.

The object carriage 45 is probably best illustrated in Figs. 4 and 5 where it will be noted that it carries a background surface 55 that may be painted to show any type of background that may be found desirable to make realistic the presentation of the ship to be bombed. In the apparatus shown, the ship to be bombed is an aircraft carrier designated by reference numeral 56 and made to the exact scale of a known type of enemy aircraft carrier. The ship is mounted on a short shaft 57 to the lower end of which is secured a sprocket 58. A sprocket chain 59 passes over the sprocket 58 and over idler rollers 60, 61 and 62 and thence over a driving sprocket 63. The relationship of the parts is well shown in Figs. 4 and 5, and those skilled in the art will appreciate that through the several sprockets and sprocket chain 59 the driving sprocket 63 may rotate the shaft 57 and thereby rotate the aircraft carrier model 56. In this way, the heading or the particular position of the aircraft carrier relatively to the object carriage 45 may be determined. It is of course obvious that the pilot must be taught the correct bombing run in all positions of the target.

The sprocket 63 is in splined or keyed relation to a shaft 64, it having a pin 65 extending into a slot 66 in the shaft 64. Because of this relationship of the parts, as the object carriage 45 moves on the rails 47 the sprocket 63 and its pin 65 will merely slide relatively to the shaft 64 with the pin in the slot 66. It will be appreciated that in all positions of the object carriage 45, rotation of the shaft 64 will be effective through the pin 65 in the slot 66 to adjust the position of the aircraft carrier model. The shaft 64 extends upwardly through the casing and through the instrument board 70. There is secured to its outer end a knob 71 whereby the shaft 64 may be rotated, all as will now be quite apparent. Through an opening 70a in the instrument board 70, a dial 71a rotatable with knob 71 may be seen, the dial being useful in indicating the heading of the model 56.

The object carriage 45 also carries an illuminating device 72 and the degree of illumination is controlled by a knob 73 on the instrument board 70. Conventional wiring and a conventional rheostat may be used for this purpose, all as those skilled in the art will fully understand.

The instrument board 70 is formed with a pair of openings 75, 76 whereby may be viewed the indicator 38. This indicator carries two sets of indicia, one set 77 indicating altitude while the other set 78 indicates distance. Because the indicator 38 is moved simultaneously with the mirror carriage 16 and object carriage 45, its position will at all times indicate the position of the object 56 relatively to the sight 12. Naturally, the indicia 77, 78 will be so calibrated on the indicator 38 that in each position of the object 56, the said object will appear to the pilot at the sight 12 just as would a real aircraft carrier at the altitude and distance shown on the indicator dial.

The manner in which the image of the aircraft carrier model 56 is reflected to the sight 12 will now be discussed. Secured on the object carriage 45 is a reflector 80. The movement of the mirror and object carriages is so calibrated that in all positions of the said carriages the reflector 80 will reflect the image of the carrier 56 and its background to the mirror 17. The image is then reflected by the mirror 17 to the sight 12. Because of the travel of the mirror carriage 16 in the inclined path determined by the rails 14, the image of the aircraft carrier will appear at different levels relatively to the sight 12 so that the pilot will see the same phenomenon as he would were he on a bombing run toward a real aircraft carrier. The manner in which the image of the carrier model 56 is reflected to sight 12 in two positions of the model carrier, is well illustrated in Fig. 2 by dash and lot lines I and I'.

Through the arrangement of the mirrors and other parts, the element of distance is of course made realistic and effective, and the pilot sees himself descending toward the carrier and approaching the carrier. Thus, the pilot will move from an apparent elevation of 400 ft. to an elevation of 50 ft. relatively to the carrier as shown in indicia 77. He will also approach the carrier from an apparent distance of 3200 ft. to within 800 ft. as evidenced by indicia 78. It is quite apparent that through the use of my apparatus the pilot will be able to visualize himself in all positions of the bombing run and will be trained to make that bombing run.

In the modification of Figs. 9 and 10 I use power means for driving the mirror and object carriages where such driving is desired. Thus it will be noted that I utilize a motor 85 that through suitable gearing within a gear box 86 drives a sprocket 87. The sprocket 87 through the chain 88 rotates the upper shaft 22 shown in Fig. 3, being in driving relation to a sprocket 89 fixed to the said shaft. When the carriage 16 moves into one of its extreme positions it operates the limit switch 90 for reversing the direction of the motor drive. When the carriage reaches the other end of its travel it contacts the limit switch 91 for again reversing the motor drive. The operation of this apparatus will be readily appreciated by those skilled in the art.

I now claim:

1. In a combination of the class described, a sighting point, a mirror movable in an inclined path upwardly toward said sighting point and adapted to reflect toward said sighting point the image of an object, an object whose image is to be reflected to said sighting point, and a reflecting system including a movable mirror for reflecting said object to said first mirror in all positions thereof.

2. In a combination of the class described, a sighting point, a mirror movable in an inclined path upwardly toward said sighting point and adapted to reflect toward said sighting point the image of an object, an object whose image is to be reflected to said sighting point, and a reflecting system for reflecting said object to said first mirror in all positions thereof.

3. In a combination of the class described, a sighting point, a mirror movable in an inclined path upwardly toward said sighting point and adapted to reflect toward said sighting point the image of an object, an object whose image is to be reflected to said sighting point, and a movable mirror for reflecting said object to said first mirror in all positions of said first mirror.

4. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, and means for reflecting said object to said mirror in all positions thereof.

5. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, and a reflecting system including a movable mirror for reflecting said object to said first mirror in all positions thereof.

6. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, and a movable mirror for reflecting said object to said first mirror in all positions of said first mirror.

7. In a combination of the class described, a sighting point, a mirror movable in an inclined path upwardly toward said sighting point and adapted to reflect toward said sighting point the image of an object, an object whose image is to be reflected to said sighting point, and means for moving said object as said mirror moves whereby to present the image of said object to said mirror in all positions thereof.

8. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, and means for moving said object as said mirror moves whereby to present the image of said object to said mirror in all positions thereof.

9. In a combination of the class described, a sighting point, a mirror movable in an inclined path upwardly toward said sighting point and adapted to reflect toward said sighting point the image of an object, an object whose image is to be reflected to said sighting point, and means for moving said object up an inclined path towards said sighting point with said object always in position for reflection by said mirror toward said sighting point.

10. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, and means for moving said object up an inclined path vertically displaced from the path of said mirror with said object always in position for reflection by said mirror toward said sighting point.

11. In a combination of the class described, a sighting point, a mirror movable in an inclined path upwardly toward said sighting point and adapted to reflect toward said sighting point the image of an object, an object whose image is to be reflected to said sighting point, reflecting means for reflecting the image of said object to said mirror, and means for moving said object and reflecting means relatively to said mirror whereby in all positions of said mirror the image of said object is reflected to said mirror and then by said mirror toward said sighting point.

12. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, reflecting means for reflecting the image of said object to said mirror, and means for moving said object and reflecting means relatively to said mirror whereby in all positions of said mirror the image of said object is reflected to said mirror and then by said mirror toward said sighting point.

13. In a combination of the class described, a sighting point, a mirror movable in an inclined path upwardly toward said sighting point and adapted to reflect toward said sighting point the image of an object, an object whose image is to be reflected to said sighting point, reflecting means for reflecting the image of said object to said mirror, and means for moving said reflecting means relatively to said mirror whereby in all positions of said mirror the image of said object is reflected to said mirror and then by said mirror toward said sighting point.

14. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, reflecting means for reflecting the image of said object to said mirror, and means for moving said reflecting means relatively to said mirror whereby in all positions of said mirror the image of said object is reflected to said mirror and then by said mirror toward said sighting point.

15. In a combination of the class described, a sighting point, a mirror movable in an inclined path upwardly toward said sighting point and adapted to reflect toward said sighting point the image of an object, an object whose image is to be reflected to said sighting point, reflecting means for reflecting the image of said object to said mirror, and means for moving said object and reflecting means in an upwardly inclined path converging with the path of said mirror, the said reflecting means in all positions thereof and said mirror reflecting to said mirror the image of said object, and the said mirror reflecting the said image toward said sighting point.

16. In a combination of the class described, a sighting point, a mirror, means mounting said mirror for movement in an inclined path upwardly toward said sighting point to reflect toward said sighting point the image of an object, said mounting means holding said mirror so that its reflecting plane is always parallel to a predetermined plane whereby said image is reflected to said sighting point at different horizontal levels in different positions of said mirror in said inclined path, an object whose image is to be reflected to said sighting point, reflecting means for reflecting the image of said object to said mirror, and means for moving said object and reflecting means in an upwardly inclined path converging with the path of said mirror, the said reflecting means in all positions thereof and said mirror reflecting to said mirror the image of said object, and the said mirror reflecting the said image toward said sighting point.

17. In a combination of the class described, a sighting point, reflecting means for reflecting the image of an object to said sighting point with said image moving in a path extending from below said sighting point upwardly and toward said sighting point, an object whose image is to be reflected toward said sighting point, and means mounting said object for movement in a path upwardly and toward said sighting point and with said object path displaced vertically from the path of the image, the displacement of said object path from said image path and the use of said reflecting means effecting the illusion of increased distance of said object from said sighting point.

18. In a combination of the class described, a sighting point, moving reflecting means for reflecting the image of an object to said sighting point with said image moving in a path extending from below said sighting point upwardly and toward said sighting point, an object whose image is to be reflected toward said sighting point, and a moving reflector for reflecting the image of said object to said reflecting means moving in a path extending upwardly and toward said sighting point and displaced vertically from the path of the image, the displacement of said reflector path from said image path and the use of said reflecting means effecting the illusion of increased distance of said object from said sighting point.

19. In a combination of the class described, a sighting point, a mirror carriage, a reflecting mirror on said carriage, guideways for said carriage forming an inclined path leading from a point vertically and horizontally displaced from said sighting point toward said sighting point, an object carriage on which is mounted an object, a reflector on said carriage for reflecting the image of said object to said mirror with the mirror reflecting the image toward said sighting point, an inclined guideway for said object carriage vertically displaced from the guideway of said mirror carriage and leading from a point vertically and horizontally displaced from said sighting point toward said sighting point, and means for moving said carriages on said guideways whereby in all positions of said carriages the image of said object will be reflected toward said sighitng point.

20. In a combination of the class described, a sighting point, a mirror carriage, a reflecting mirror fixed on said carriage, guideways for said carriage forming an inclined path leading from a point vertically and horizontally displaced from said sighting point toward said sighting point, an object carriage on which is mounted an object, a reflector on said carriage for reflecting the image of said object to said mirror with the mirror reflecting the image toward said sighting point, an inclined guideway for said object carriage vertically displaced from the guideway of said mirror carriage and leading from a point vertically and horizontally displaced from said sighting point toward said sighting point, means for moving said carriages on said guideways whereby in all positions of said carriages the image of said object will be reflected toward said sighting point, indicators at said sighting point designating the altitude and distance differentials between said object and sighting point, and means for actuating said indicators as said carriages are moved.

21. In a combination of the class described, a sighting point, a mirror movable in a path toward said sighting point and adapted to reflect toward said sighting point the image of an object, an object whose image is to be reflected to said sighting point, means for moving said object as said mirror moves whereby to present the image of said object to said mirror in all positions thereof, indicators at said sighting point designating the altitude and distance differentials between said object and sighting point, and means for actuating said indicators as said object carriage is moved.

22. In a combination of the class described, a sighting point, a mirror, means mounting said mirror for movement toward said sighting point to reflect toward said sighting point the image of an object, an object whose image is to be reflected to said sighting point, reflecting means for reflecting the image of said object to said mirror, and means for moving said object and reflecting means in a path converging with the path of said mirror, the said reflecting means in all positions thereof and said mirror reflecting to said mirror the image of said object, and the said mirror reflecting the said image toward said sighting point.

23. In a combination of the class described, a moving carriage having reflecting means thereon, means mounting said carriage for movement in a predetermined path, an object whose image is to be reflected by said reflecting means, means mounting said object on said carriage for movement relatively to said carriage and for movement with said carriage, operating means moving with said carriage and adapted to move said object on its mounting means to change its position relatively to said reflecting means, and a rotatable member extending parallel to the path of said carriage and maintained in operative relation to said operating means for actuating said operating means in all positions of said carriage.

24. In a combination of the class described, a sighting point, a mirror movable in a predetermined path toward said sighting point and adapted to reflect toward said sighting point the image of an object, an object whose image is to be reflected to said sighting point, a reflecting system including a movable mirror moving in a path angular to and converging with the path of said first mirror, and means for moving both said mirrors simultaneously for reflecting said object to said first mirror in all positions thereof.

25. In a combination of the class described, a sighting point, a mirror, means mounting said mirror for movement in a predetermined path toward said sighting point to reflect toward said sighting point the image of an object, said mounting means holding said mirror so that its reflecting plane is always parallel to a predetermined plane whereby said image is reflected to said sighting point at different planes in different positions of said mirror in said path, an object whose image is to be reflected to said sighting point, a reflecting system including a movable mirror for reflecting said object to said first mirror in all positions thereof, and means for moving said first and second mirrors simultaneously.

26. In a combination of the class described, a sighting point, a mirror, means mounting said mirror for movement in a predetermined path toward said sighting point to reflect toward said sighting point the image of an object, said mounting means holding said mirror so that its reflecting plane is always parallel to a predetermined plane whereby said image is reflected to said sighting point in different planes in different positions of said mirror in said path, an object whose image is to be reflected to said sighting point, and means for moving said object in a path angular to said first path as said mirror moves whereby to present the image of said object to said mirror in all positions thereof.

27. In a combination of the class described, a sighting point, a mirror, means mounting said mirror for movement in a predetermined path toward said sighting point to reflect toward said sighting point the image of an object, said mounting means holding said mirror so that its reflecting plane is always parallel to a predetermined plane whereby said image is reflected to said sighting point in different planes in different positions of said mirror in said path, an object whose image is to be reflected to said sighting point, reflecting means for reflecting the image of said object to said mirror, and means for moving said object and reflecting means in a path relatively to said mirror path whereby in all positions of said mirror the image of said object is reflected to said mirror and then by said mirror toward said sighting point.

LUTHER G. SIMJIAN.